US012579551B2

(12) United States Patent
Anderson et al.

(10) Patent No.: US 12,579,551 B2
(45) Date of Patent: Mar. 17, 2026

(54) POS DEVICES AS BEACONS FOR CUSTOMER LOCATION IDENTIFICATION

(71) Applicant: Shopify Inc., Ottawa (CA)

(72) Inventors: Charles Anderson, Smyrna, GA (US); Luke James Sartori, St. John's (CA); Michael Joseph DeFazio, Fonthill (CA); Silvana Zaldivar, Toronto (CA)

(73) Assignee: Shopify Inc., Ottawa (CA)

( * ) Notice: Subject to any disclaimer, the term of this patent is extended or adjusted under 35 U.S.C. 154(b) by 242 days.

(21) Appl. No.: 18/467,854

(22) Filed: Sep. 15, 2023

(65) Prior Publication Data

US 2025/0095004 A1      Mar. 20, 2025

(51) Int. Cl.
*G06Q 30/0201* (2023.01)
*H04W 4/029* (2018.01)
*H04W 4/33* (2018.01)

(52) U.S. Cl.
CPC ........ *G06Q 30/0201* (2013.01); *H04W 4/029* (2018.02); *H04W 4/33* (2018.02)

(58) Field of Classification Search
CPC ........... G06Q 20/3224; G06Q 30/0639; G06Q 30/0261; G06Q 20/4015; G06Q 30/0205; H04W 4/025
USPC .................................................... 340/539.13
See application file for complete search history.

(56) References Cited

U.S. PATENT DOCUMENTS

| | | | | |
|---|---|---|---|---|
| 8,590,786 | B2 * | 11/2013 | Schueller ........... | G06Q 30/0639 |
| | | | | 235/383 |
| 10,235,692 | B2 * | 3/2019 | Artman .............. | G06Q 30/0261 |

| | | | | |
|---|---|---|---|---|
| 10,255,614 | B2 * | 4/2019 | Roeding ............ | G06Q 20/3224 |
| 11,037,192 | B1 * | 6/2021 | Nash .................. | G06Q 30/0205 |
| 11,373,217 | B2 * | 6/2022 | Michaelson ....... | G06Q 30/0261 |
| 11,816,655 | B1 * | 11/2023 | Moshfeghi ......... | G06Q 20/3278 |
| 11,989,789 | B2 * | 5/2024 | Lacoss-Arnold ...... | G06Q 20/20 |
| 2010/0274680 | A1 * | 10/2010 | Carlson .............. | G06Q 30/0601 |
| | | | | 705/26.1 |
| 2014/0279010 | A1 * | 9/2014 | Calman .............. | G06Q 30/0261 |
| | | | | 705/14.58 |
| 2014/0365334 | A1 * | 12/2014 | Hurewitz ........... | G06Q 30/0613 |
| | | | | 705/26.41 |
| 2016/0232515 | A1 * | 8/2016 | Jhas ........................ | G06Q 30/06 |
| 2017/0109789 | A1 * | 4/2017 | Major ................ | G06Q 30/0261 |
| 2017/0116589 | A1 * | 4/2017 | Krishnaiah .......... | G06Q 20/322 |
| 2018/0232796 | A1 * | 8/2018 | Glaser .................... | G06Q 90/20 |
| 2021/0035196 | A1 * | 2/2021 | Resheff ............. | G06Q 30/0639 |

(Continued)

*Primary Examiner* — Eric Blount

(74) *Attorney, Agent, or Firm* — Withrow & Terranova, PLLC

(57) ABSTRACT

Systems and methods are disclosed for positioning of a device of interest within a merchant environment. In this regard, embodiments of a computer implemented method for positioning of a device of interest within a merchant environment are disclosed. In one embodiment, the computer implemented method comprises obtaining positions of a plurality of mobile merchant devices within a merchant environment, obtaining data indicative of a relative position of a device of interest relative to one or more of the plurality of mobile merchant devices, and computing a position of the device of interest within the merchant environment based on the data indicative of the relative position of the device of interest relative to the one or more of the plurality of mobile merchant devices and positions of the one or more of the plurality of mobile merchant devices.

22 Claims, 12 Drawing Sheets

(56)  References Cited

U.S. PATENT DOCUMENTS

| | | | | |
|---|---|---|---|---|
| 2021/0081924 A1* | 3/2021 | Jhas | .................. | G06Q 20/3224 |
| 2025/0166015 A1* | 5/2025 | Hu | .................... | G06Q 30/0261 |
| 2025/0166036 A1* | 5/2025 | Hu | .................... | G06Q 30/0633 |

* cited by examiner

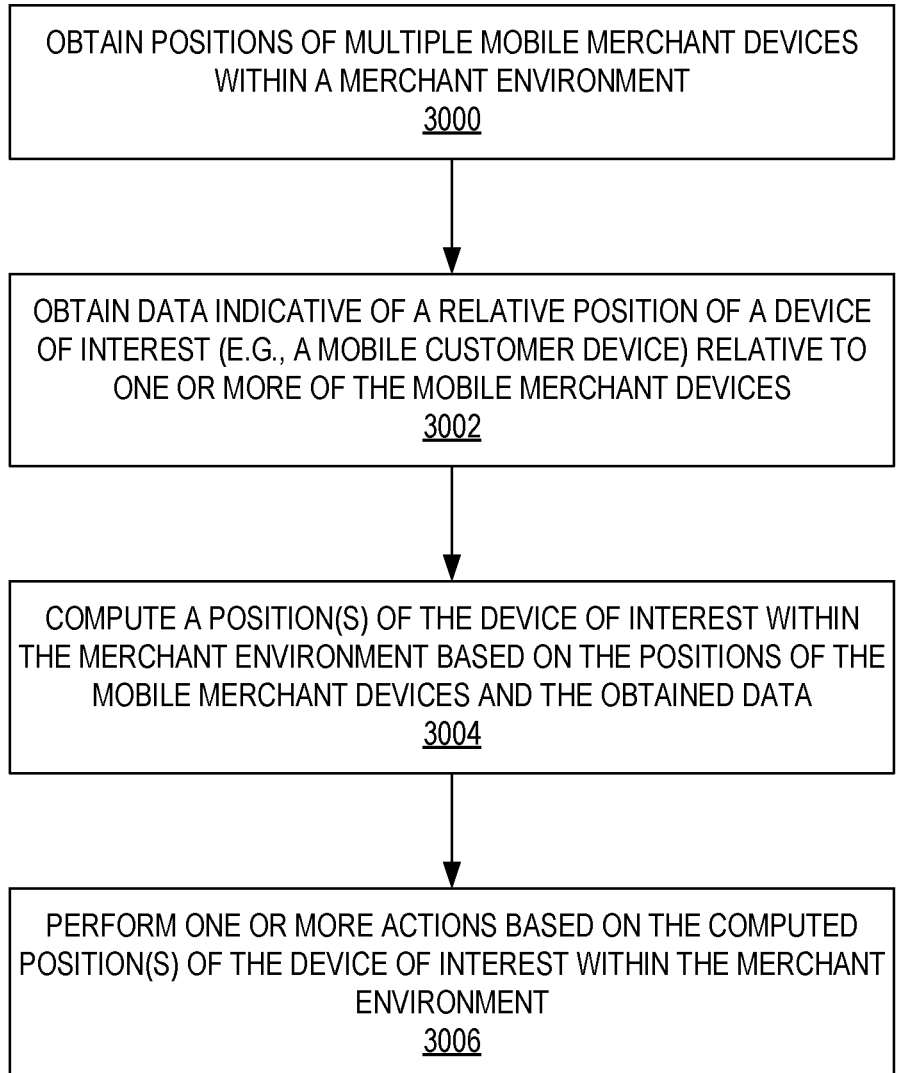

OBTAIN POSITIONS OF MULTIPLE MOBILE MERCHANT DEVICES
WITHIN A MERCHANT ENVIRONMENT
<u>3000</u>

OBTAIN DATA INDICATIVE OF A RELATIVE POSITION OF A DEVICE
OF INTEREST (E.G., A MOBILE CUSTOMER DEVICE) RELATIVE TO
ONE OR MORE OF THE MOBILE MERCHANT DEVICES
<u>3002</u>

COMPUTE A POSITION(S) OF THE DEVICE OF INTEREST WITHIN
THE MERCHANT ENVIRONMENT BASED ON THE POSITIONS OF THE
MOBILE MERCHANT DEVICES AND THE OBTAINED DATA
<u>3004</u>

PERFORM ONE OR MORE ACTIONS BASED ON THE COMPUTED
POSITION(S) OF THE DEVICE OF INTEREST WITHIN THE MERCHANT
ENVIRONMENT
<u>3006</u>

FIG. 3

POS DEVICES AS BEACONS FOR CUSTOMER LOCATION IDENTIFICATION

TECHNICAL FIELD

The present disclosure relates to positioning of devices within a merchant environment, such as, e.g., a store that sells various goods such as, e.g., grocery items.

BACKGROUND

Smart merchant environments (e.g., smart stores such as smart grocery stores) are starting to emerge. These smart merchant environments often rely on knowledge of the positions of users, or customers, within the merchant environment.

SUMMARY

Systems and methods are disclosed for positioning of a device of interest, such as a mobile customer device, within a merchant environment. Embodiments disclosed herein enable such positioning with little or no additional infrastructure beyond what is commonly found in merchant environments. In this regard, embodiments of a computer implemented method for positioning of a device of interest within a merchant environment are disclosed. In one embodiment, the computer implemented method comprises obtaining positions of a plurality of mobile merchant devices within a merchant environment, obtaining data indicative of a relative position of a device of interest relative to one or more of the plurality of mobile merchant devices, and computing a position of the device of interest within the merchant environment based on the data indicative of the relative position of the device of interest relative to the one or more of the plurality of mobile merchant devices and positions of the one or more of the plurality of mobile merchant devices. In this manner, the position of the device of interest can be obtained based on relative positioning to mobile merchant devices without requiring costly infrastructure such as a network of wired sensors installed in the merchant environment.

In one embodiment, the device of interest is a mobile customer device. In another embodiment, the device of interest is a device attached to, integrated into, or otherwise associated to an object of interest.

In one embodiment, the positions of the plurality of mobile merchant devices are obtained via a first positioning technology, and the position of the device of interest is computed based on location data obtained via one or more second positioning technologies that are different than the first positioning technology. In one embodiment, the first positioning technology is a Global Navigation Satellite System (GNSS), Ultra-Wideband (UWB), or Wi-Fi positioning technology. In one embodiment, the one or more second positioning technologies comprise a Bluetooth positioning technology.

In one embodiment, obtaining the positions of the plurality of mobile merchant devices within the merchant environment comprises obtaining a plurality of positions for each of the plurality of mobile merchant devices within the merchant environment over time. In one embodiment, the data indicative of the relative position of the device of interest relative to the one or more of the plurality of mobile merchant devices comprises data indicative of a plurality of relative positions of the device of interest relative to the one or more of the plurality of mobile merchant devices over time. In one embodiment, the position computed for the device of interest is a first position computed for the device of interest for a first point in time, and the method further comprises computing one or more additional positions for the device of interest within the merchant environment for one or more additional points in time based on the data indicative of the relative position of the device of interest relative to the one or more of the plurality of mobile merchant devices and the positions of the one or more of the plurality of mobile merchant devices, for the respective one or more additional points in time.

In one embodiment, obtaining the positions of the plurality of mobile merchant devices within the merchant environment comprises receiving the positions from the plurality of mobile merchant devices.

In one embodiment, the data indicative of the relative position of the device of interest relative to the one or more of the plurality of mobile merchant devices comprises: (a) measurements on radio signals received at the device of interest from the one or more of the plurality of mobile merchant devices, (b) measurements on radio signals received at one or more of the plurality of mobile merchant devices from the device of interest, or (c) both (a) and (b).

In one embodiment, obtaining the data indicative of the relative position of the device of interest relative to the one or more of the plurality of mobile merchant devices comprises obtaining the measurements of the radio signals received, from one or more of the plurality of mobile merchant devices, at the device of interest. In one embodiment, the measurements of the radio signals received, from one or more of the plurality of mobile merchant devices, at the device of interest comprises receiving the measurements of the radio signals from the device of interest. In one embodiment, the measurements of the radio signals are time-based or signal-strength-based measurements indicative of distances between the device of interest and the one or more of the plurality of mobile merchant devices.

In one embodiment, obtaining the data indicative of the relative position of the device of interest relative to the one or more of the plurality of mobile merchant devices comprises obtaining the measurements of radio signals received, from the device of interest, at one or more of the plurality of mobile merchant devices. In one embodiment, obtaining the measurements of the radio signals received, from the device of interest, at one or more of the plurality of mobile merchant devices comprises receiving the measurements of the radio signals from the one or more of the plurality of mobile merchant devices. In one embodiment, the radio signals are time-based or signal-strength-based measurements indicative of distances between the device of interest and the one or more of the plurality of mobile merchant devices.

In one embodiment, the data indicative of the relative position of the device of interest relative to the one or more of the plurality of mobile merchant devices comprises data indicative of distances between the device of interest and three or more of the plurality of mobile merchant devices. Computing the position of the device of interest within the merchant environment comprises triangulating the position of the device of interest within the merchant environment based on the data indicative of the distances between the device of interest and the three or more of the plurality of mobile merchant devices and positions of the three or more of the plurality of mobile merchant devices within the merchant environment.

In one embodiment, the data indicative of the relative position of the device of interest relative to the one or more of the plurality of mobile merchant devices comprises first data indicative of a first relative position of the device of interest relative to a first subset of the plurality of mobile merchant devices and second data indicative of a second relative position of the device of interest relative to a second subset of the plurality of mobile merchant devices. Computing the position of the device of interest within the merchant environment comprises computing a first position of the device of interest within the merchant environment based on the first data and positions of the first subset of the plurality of mobile merchant devices within the merchant environment, computing a second position of the device of interest within the merchant environment based on the second data and positions of the second subset of the plurality of mobile merchant devices within the merchant environment, and combining the first position and the second position to provide the position of the device of interest within the merchant environment. In one embodiment, the first position of the device of interest and the second position of the device of interest are associated to a same time instant.

In one embodiment, the method further comprises performing one or more actions based on the position of the device of interest.

Corresponding embodiments of a processing node for performing the aforementioned computer implemented method are also disclosed.

BRIEF DESCRIPTION OF THE DRAWINGS

Embodiments will be described, by way of example only, with reference to the accompanying figures wherein:

FIG. 3 is a flow chart that illustrates the operation of a central processing node of the positioning system to compute positions of a mobile customer device within the merchant environment over time, according to one embodiment;

Like reference numerals are used in the drawings to denote like elements and features.

DETAILED DESCRIPTION OF EMBODIMENTS

Existing solutions for smart merchant environments require operators to deploy additional infrastructure in their merchant environments regardless of whether the merchant environments are permanent environments (e.g., brick-and-mortar stores) or temporary environments (e.g., popup shops). This infrastructure typically includes many sensors and associated wiring used to track the positions of customers within the merchant environment. Such infrastructure is costly and may, in some cases, require that a merchant environment be closed for business for some amount of time to allow the infrastructure to be installed. For example, in the case of converting an existing grocery store into a smart grocery store, the operator may be required to close the grocery store for weeks if not months in order to install the required infrastructure. Thus, there is a need for systems and methods that avoid or mitigate the need for additional infrastructure to be deployed in a smart merchant environment.

Systems and methods are disclosed that utilize mobile merchant devices (e.g., mobile Point of Sale (POS) devices) for positioning of mobile customer devices within a merchant environment. Note that, as used herein, a mobile merchant device is any type of device (e.g., a POS device, a device carried or worn by employees of the merchant as the employees move around the merchant environment, or the like) that is under the control of the merchant as the device moves around the merchant environment (e.g., as it is carried by an employee as the employee moves around the merchant environment). Similarly, a mobile customer device is any type of device that is carried by, worn by, or otherwise moves along with a customer and is under the control of the customer as the customer moves round the merchant environment. One non-limiting example of a mobile customer device is a customer's mobile device (e.g., a smart phone).

Figure 1:
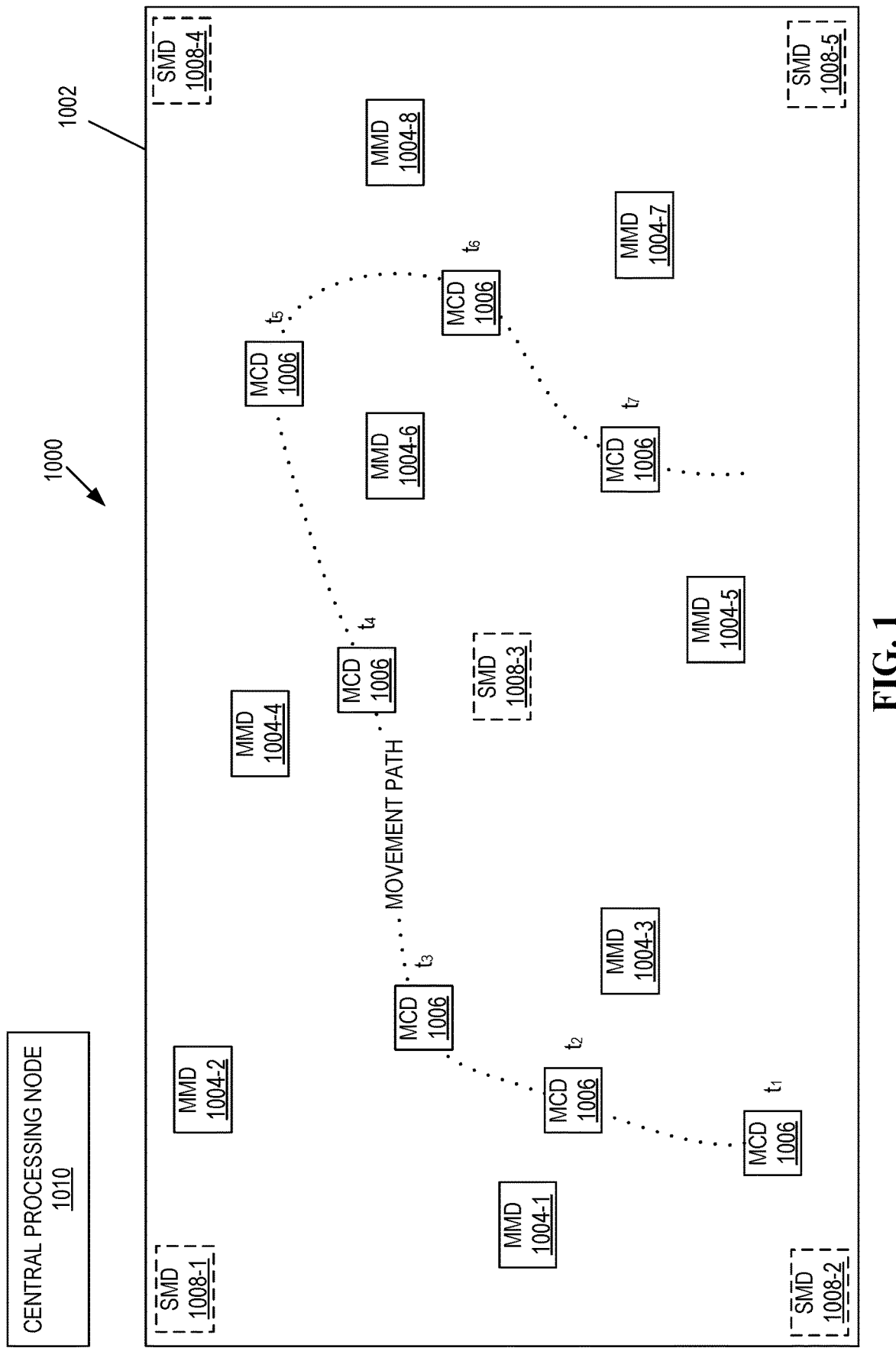
FIG. 1 illustrates an example of a positioning system for a merchant environment, according to one embodiment.

In this regard, FIG. 1 illustrates one example of a positioning system 1000 for a merchant environment 1002 in which embodiments of the present disclosure may be implemented. In this example, the positioning system 1000 includes mobile merchant devices 1004-1 through 1004-8, a mobile customer device 1006, and optionally stationary merchant devices 1008-1 through 1008-5. The mobile merchant devices 1004-1 through 1004-8 are generally referred to herein collectively as mobile merchant devices 1004 and individually as mobile merchant device 1004. Likewise, the stationary merchant devices 1008-1 through 1008-5 are generally referred to herein collectively as stationary merchant devices 1008 and individually as stationary merchant device 1008. Further, while eight mobile merchant devices 1004 and five stationary merchant devices 1008 are illustrated in this example, this is only an example. There may be any number of mobile merchant devices 1004 and optionally any number of stationary merchant devices 1008. Likewise, while only one mobile customer device 1006 is illustrated in FIG. 1, there may be any number of mobile customer devices 1006. Note that a stationary merchant device 1008 is a device that is under the control of the merchant and is positioned at a fixed location within the merchant environment 1002. Examples of stationary merchant devices 1008 include, but are not limited to, wireless (e.g., Wi-Fi®) access points, wireless sensors, or the like. The positioning system 1000 also includes a central processing node 1010 which may, for example, be implemented locally as or on a local server computer at the merchant environment 1002 or implemented remotely via a remote server or via a cloud-based solution (e.g., via a remote server or software solution implemented in the cloud).

In operation, the positioning system 1000 operates to track positions of the mobile customer device 1006 within the merchant environment 1002 over time based on: (1) obtaining positions of the mobile merchant devices 1004 within the merchant environment 1002 over time, (2) obtaining relative positions of the mobile customer device 1006 relative to the mobile merchant devices 1004 (and optionally the stationary merchant devices 1008) over time, and (3) determining the positions of the mobile customer device 1006 within the merchant environment 1002 over time based on the obtained positions of the mobile merchant devices 1004 within the merchant environment 1002 and the obtained relative positions of the mobile customer device 1006. Any suitable positioning technology or any suitable combination of positioning technologies may be used. Some examples are given in the description below; however, the embodiments of the present disclosure are not limited thereto.

FIGS. 2A through 2G illustrate one example of the operation of the positioning system 1000 of FIG. 1 as the mobile customer device 1006 moves within the merchant environment 1002. The path that the mobile customer device 1006 moves along is represented by a dotted line. The mobile merchant devices 1004 also move within the merchant environment over time. Each of FIGS. 2A through 2G illustrate the positioning system 1000 at different points in time, denoted as times $t_1$, $t_2$, . . . , $t_7$. At each of times $t_1$, $t_2$, . . . , and $t_7$, the position of the mobile customer device 1006 relative to one or more of the mobile merchant devices 1004 is obtained based on: measurements performed at the mobile customer device 1006 on signals received at the mobile customer device 1006 from one or more of the mobile merchant devices 1004 and/or measurements performed at one or more of the mobile merchant devices 1004 on a signal(s) received at the one or more mobile merchant devices 1004 from the mobile customer device 1006. Using such signals, any suitable positioning technique (e.g., triangulation based on distances between the mobile customer device 1006 and three or more mobile merchant devices 1004 where these distances are estimated based on measurements such as, e.g., received strength of signal measurements, Time of Arrival (ToA) measurements, or the like) can be used to obtain the position of the mobile customer device 1006 relative to one or more of the mobile merchant devices 1004.

Figure 2A:
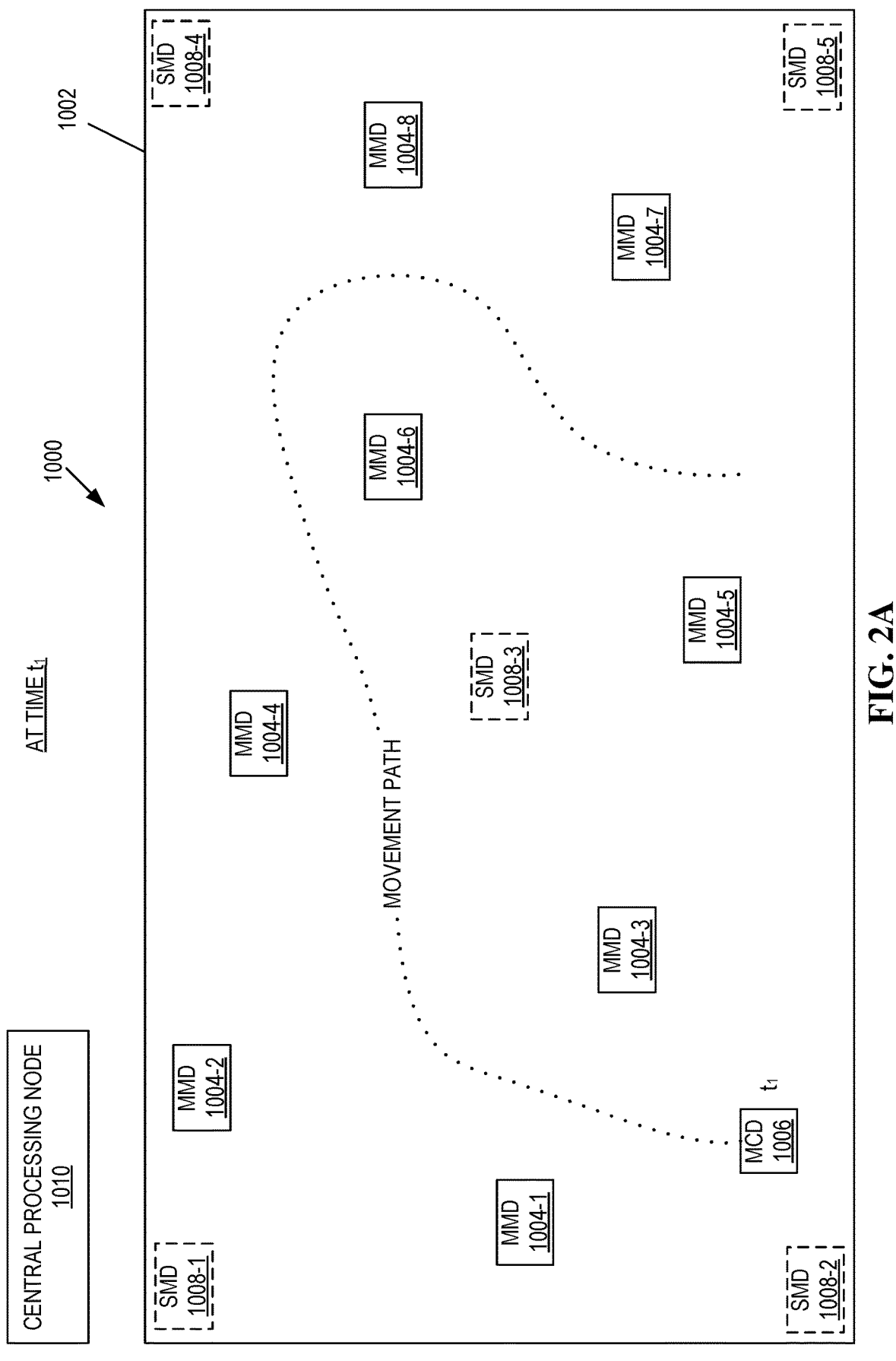
FIG. 2A-FIG. 2G illustrate an example scenario in which the position of a mobile customer device is tracked as the mobile customer device moves within the merchant environment, according to one embodiment.

In this regard, Table 1 illustrates an example in which the measurements are Received Strength of Signal Indicator (RSSI) values. In the example of FIG. 2A and Table 1, at time $t_1$, three measurements are obtained: one RSSI measurement for a signal received at the mobile customer device 1006 from the mobile merchant device 1004-1 (or vice versa), another RSSI measurement for a signal received at the mobile customer device 1006 from the mobile merchant device 1004-3 (or vice versa), and another RSSI measurement for a signal received at the mobile customer device 1006 from the stationary merchant device 1008-2 (or vice versa). These measurements are reported to the central processing node 1010, and the central processing node 1010 computes a position of the mobile customer device 1006 at time $t_1$ relative to the mobile merchant device 1004-1, relative to the mobile merchant device 1004-3, and/or relative to the stationary merchant device 1008-2, based on the measurements.

Figure 2B:
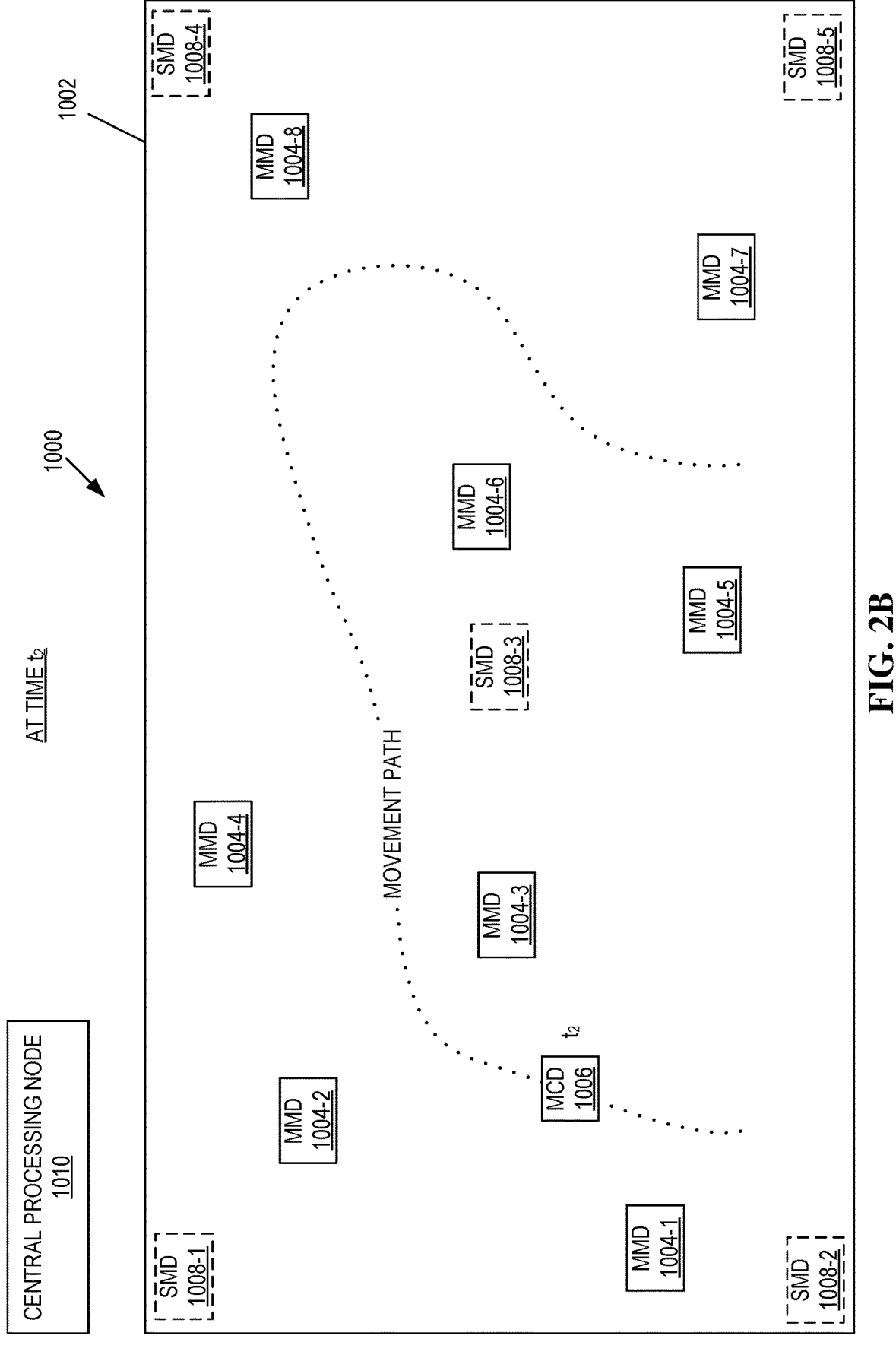

In the example of FIG. 2B and Table 1, at time $t_2$, three measurements are obtained: one RSSI measurement for a signal received at the mobile customer device 1006 from the mobile merchant device 1004-1 (or vice versa), another RSSI measurement for a signal received at the mobile customer device 1006 from the mobile merchant device 1004-3 (or vice versa), and another RSSI measurement for a signal received at the mobile customer device 1006 from the mobile merchant device 1004-2 (or vice versa). These measurements are reported to the central processing node 1010, and the central processing node 1010 computes a position of the mobile customer device 1006 at time $t_2$ relative to the mobile merchant device 1004-1, relative to the mobile merchant device 1004-3, and/or relative to the mobile merchant device 1004-2, based on the measurements.

Figure 2C:
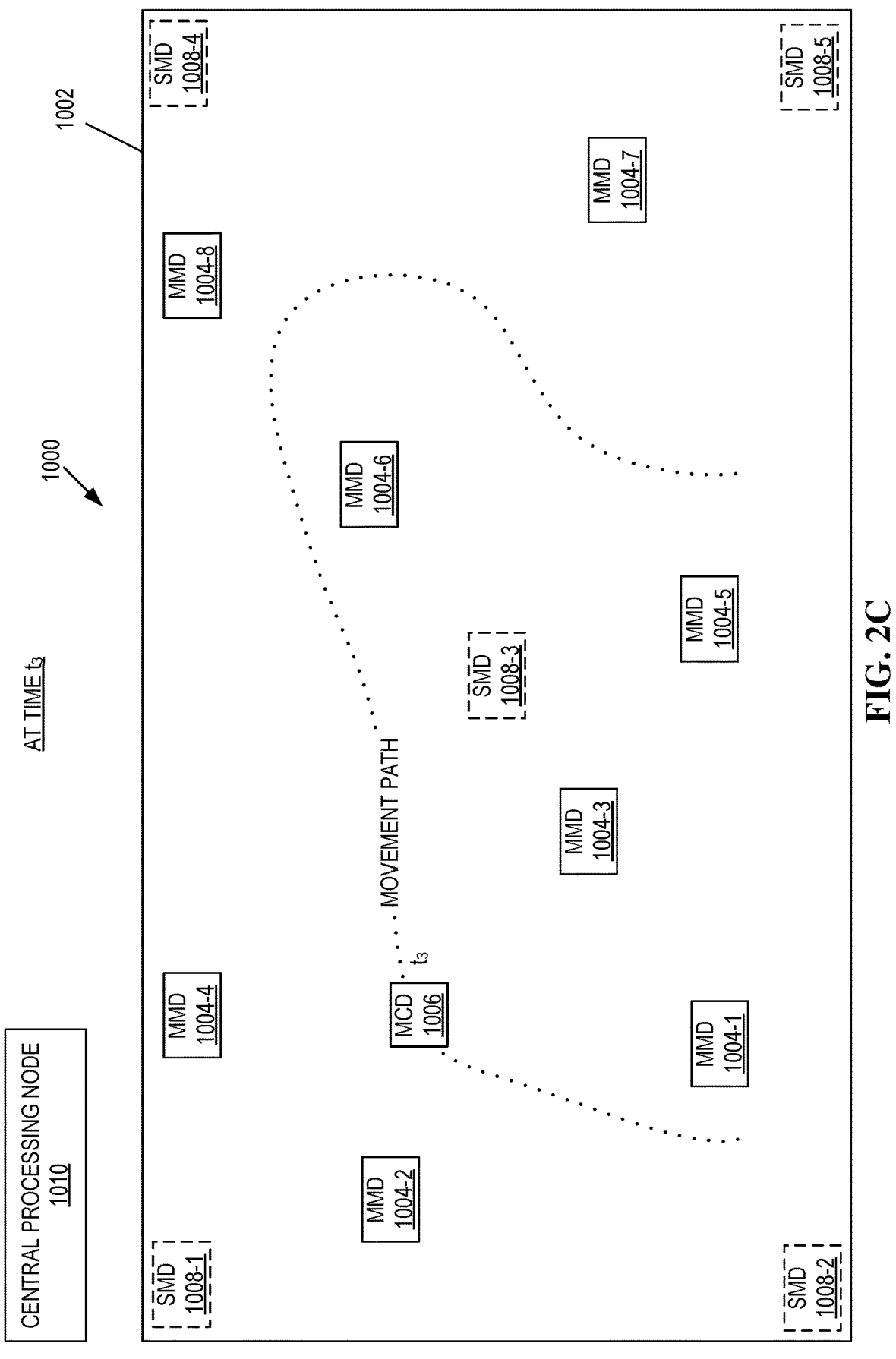

In the example of FIG. 2C and Table 1, at time $t_3$, three measurements are obtained: one RSSI measurement for a signal received at the mobile customer device 1006 from the mobile merchant device 1004-2 (or vice versa), another RSSI measurement for a signal received at the mobile customer device 1006 from the mobile merchant device 1004-3 (or vice versa), and another RSSI measurement for a signal received at the mobile customer device 1006 from the mobile merchant device 1004-4 (or vice versa). These measurements are reported to the central processing node 1010, and the central processing node 1010 computes a position of the mobile customer device 1006 at time $t_3$ relative to the mobile merchant device 1004-2, relative to the mobile merchant device 1004-3, and/or relative to the mobile merchant device 1004-4, based on the measurements.

Figure 2D:
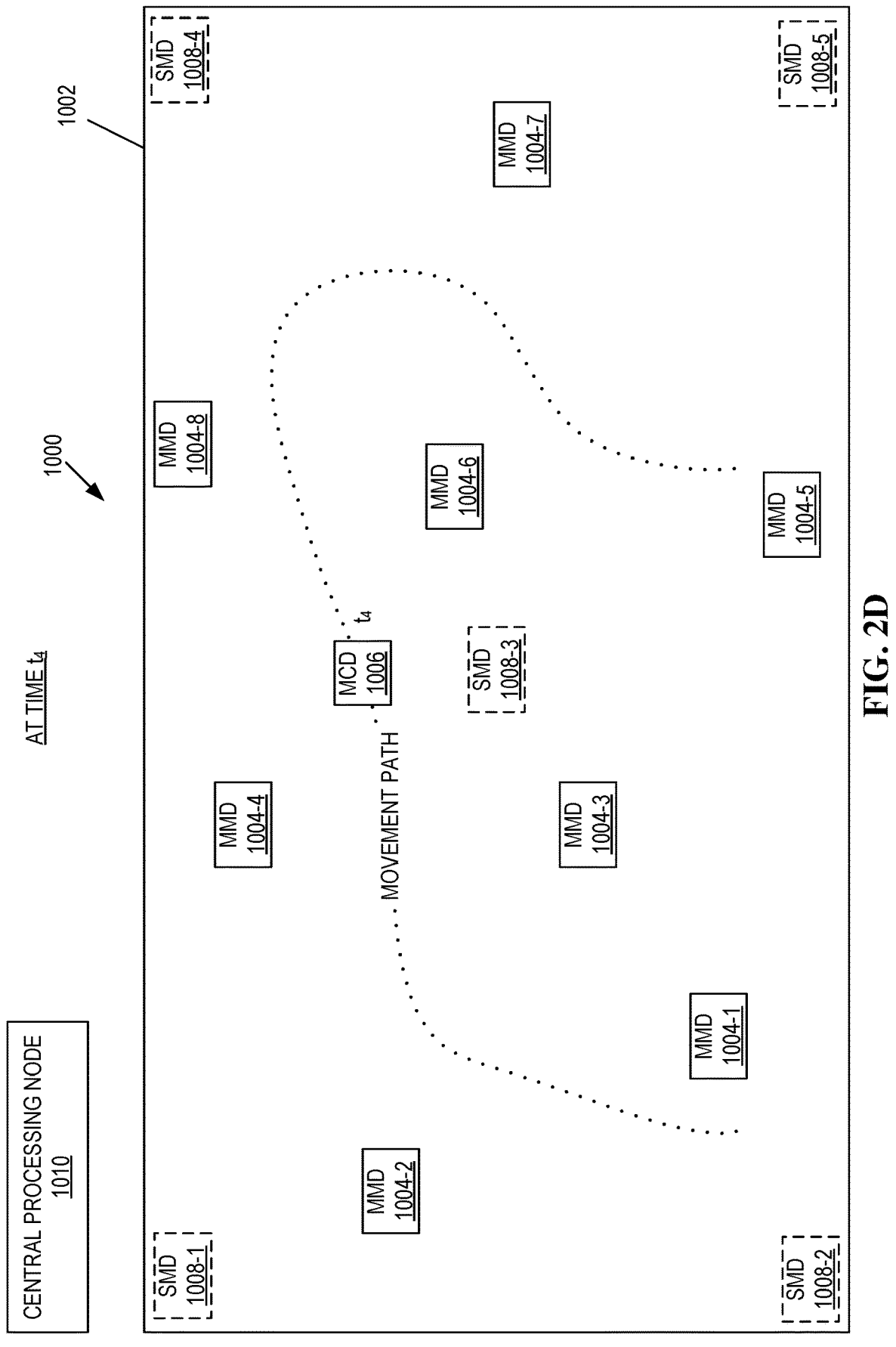

In the example of FIG. 2D and Table 1, at time $t_4$, three measurements are obtained: one RSSI measurement for a signal received at the mobile customer device 1006 from the mobile merchant device 1004-4 (or vice versa), another RSSI measurement for a signal received at the mobile customer device 1006 from the stationary merchant device 1008-3 (or vice versa), and another RSSI measurement for a signal received at the mobile customer device 1006 from the mobile merchant device 1004-6 (or vice versa). These measurements are reported to the central processing node 1010, and the central processing node 1010 computes a position of the mobile customer device 1006 at time $t_4$ relative to the mobile merchant device 1004-4, relative to the stationary merchant device 1008-3, and/or relative to the mobile merchant device 1004-6, based on the measurements.

Figure 2E:
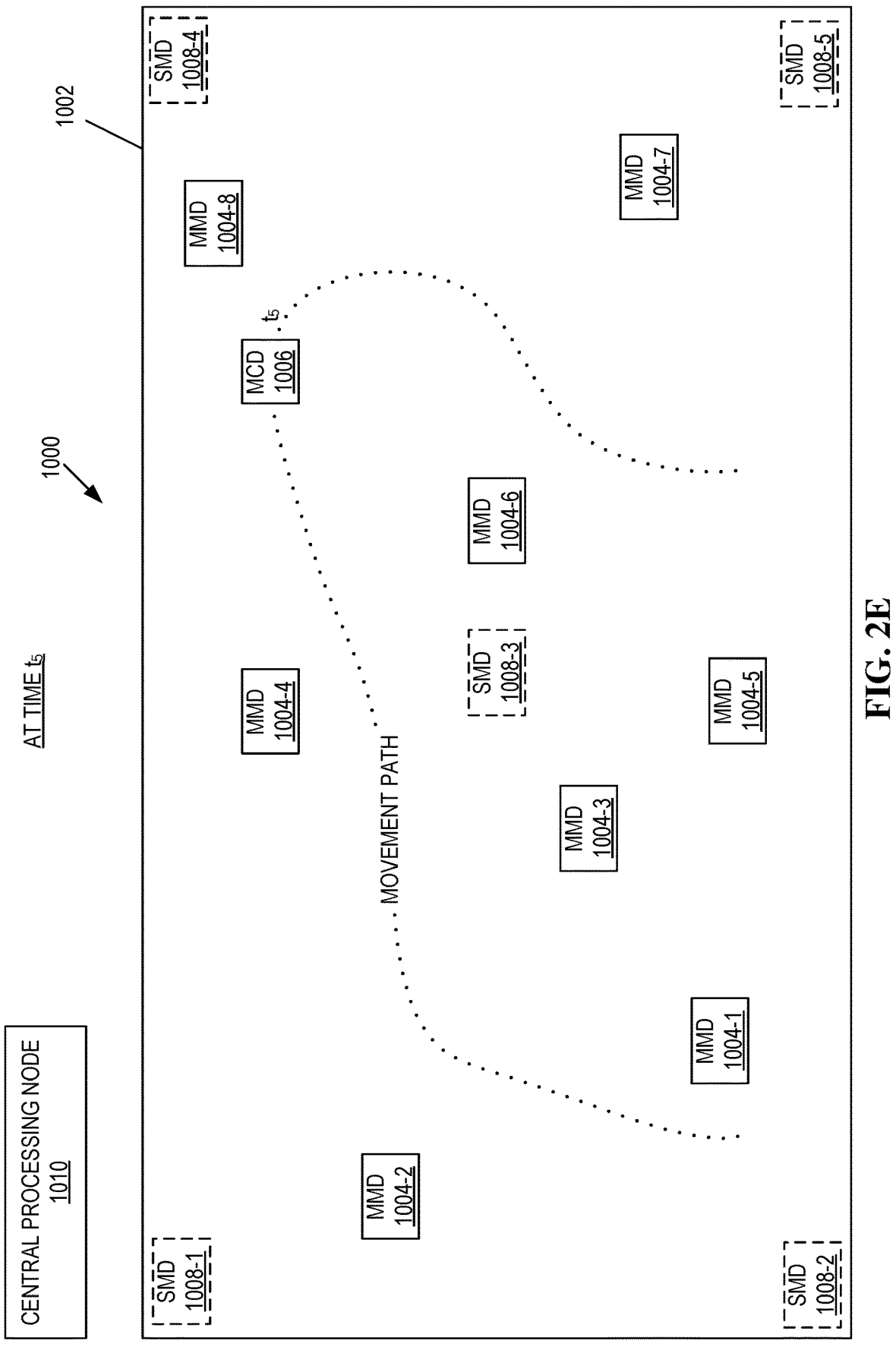

In the example of FIG. 2E and Table 1, at time $t_5$, three measurements are obtained: one RSSI measurement for a signal received at the mobile customer device 1006 from the mobile merchant device 1004-4 (or vice versa), another RSSI measurement for a signal received at the mobile customer device 1006 from the mobile merchant device 1004-6 (or vice versa), and another RSSI measurement for a signal received at the mobile customer device 1006 from the mobile merchant device 1004-8 (or vice versa). These measurements are reported to the central processing node 1010, and the central processing node 1010 computes a position of the mobile customer device 1006 at time $t_5$ relative to the mobile merchant device 1004-4, relative to the mobile merchant device 1004-6, and/or relative to the mobile merchant device 1004-8, based on the measurements.

Figure 2F:
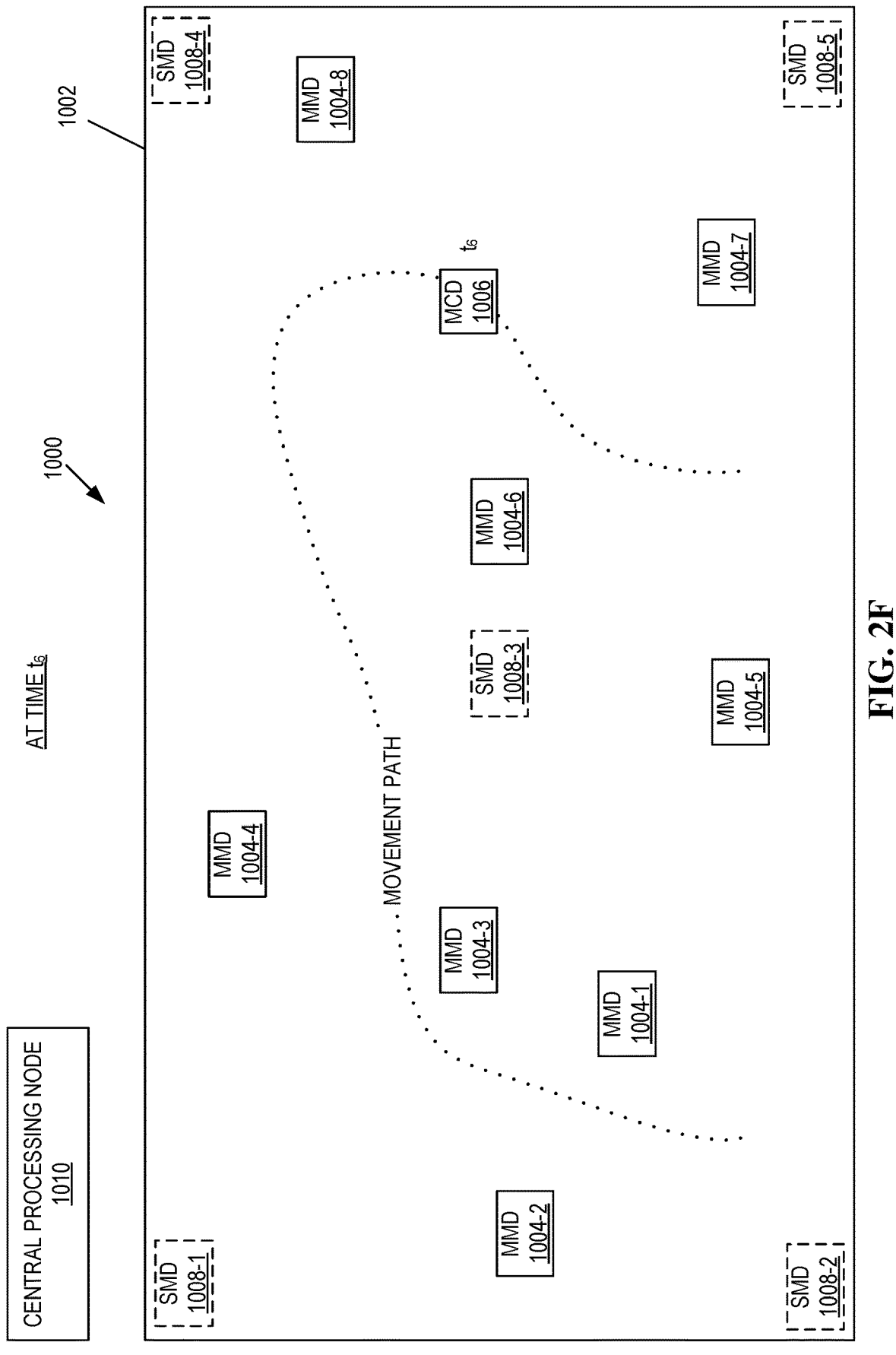

In the example of FIG. 2F and Table 1, at time to, three measurements are obtained: one RSSI measurement for a signal received at the mobile customer device 1006 from the mobile merchant device 1004-6 (or vice versa), another RSSI measurement for a signal received at the mobile customer device 1006 from the mobile merchant device 1004-7 (or vice versa), and another RSSI measurement for a signal received at the mobile customer device 1006 from the mobile merchant device 1004-8 (or vice versa). These measurements are reported to the central processing node 1010, and the central processing node 1010 computes a position of the mobile customer device 1006 at time $t_6$ relative to the mobile merchant device 1004-6, relative to the mobile merchant device 1004-7, and/or relative to the mobile merchant device 1004-8, based on the measurements.

Figure 2G:
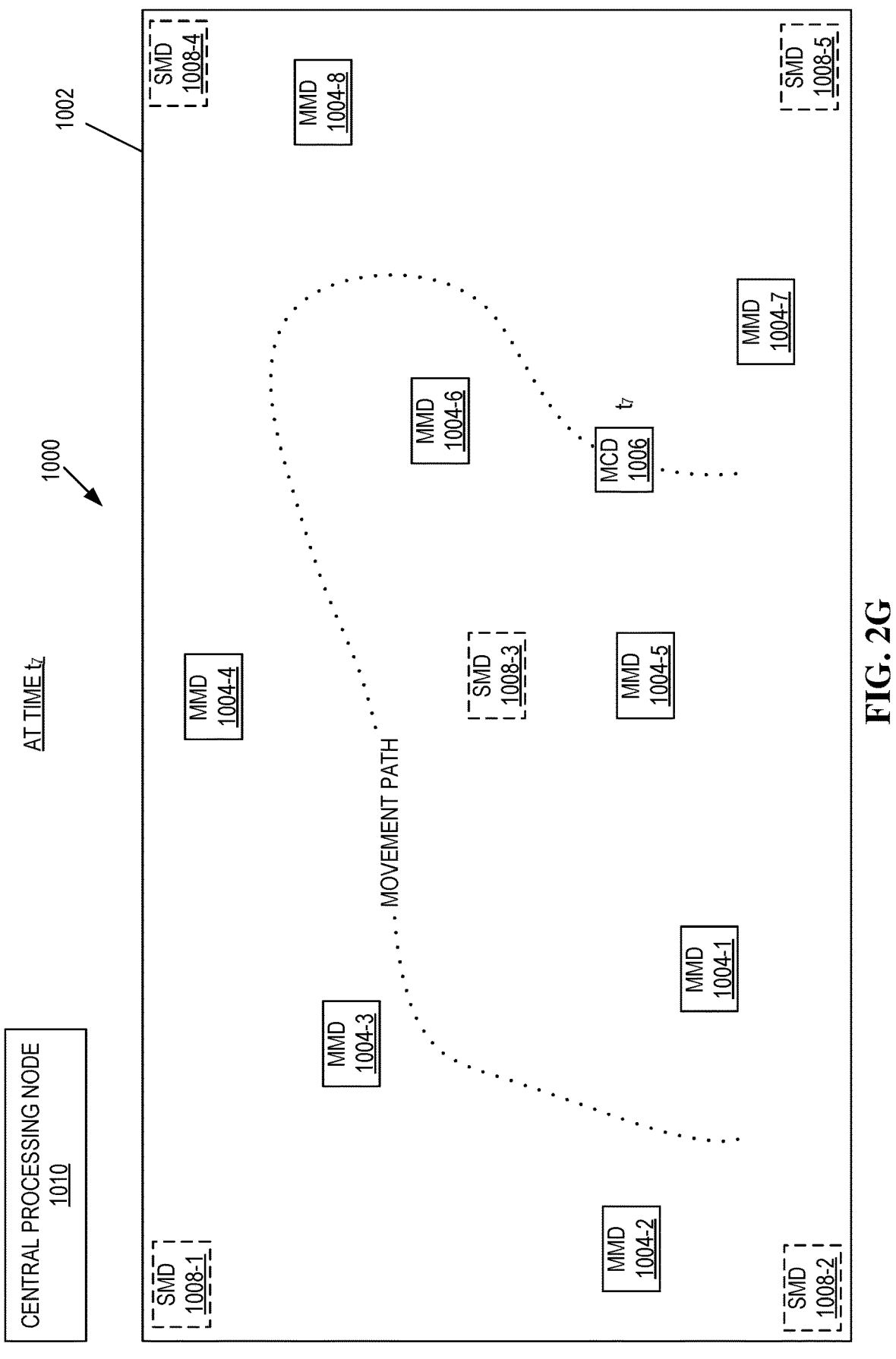

In the example of FIG. 2G and Table 1, at time $t_7$, three measurements are obtained: one RSSI measurement for a signal received at the mobile customer device 1006 from the mobile merchant device 1004-5 (or vice versa), another RSSI measurement for a signal received at the mobile customer device 1006 from the mobile merchant device 1004-6 (or vice versa), and another RSSI measurement for a signal received at the mobile customer device 1006 from the mobile merchant device 1004-7 (or vice versa). These measurements are reported to the central processing node 1010, and the central processing node 1010 computes a position of the mobile customer device 1006 at time $t_7$ relative to the mobile merchant device 1004-5, relative to the mobile merchant device 1004-6, and/or relative to the mobile merchant device 1004-7, based on the measurements.

customer device 1006 relative to the mobile merchant devices 1004 and optionally the stationary merchant devices 1008 into positions of the mobile customer device 1006 within the merchant environment 1002 over time.

FIG. 3 is a flow chart that illustrates the operation of the central processing node 1010 in accordance with exemplary embodiments of the present disclosure. Note that while the actions performed by the central processing node 1010 are referred to in the following description as steps and illustrated in FIG. 3 as being performed in a particular order, the steps or actions performed by the central processing node 1010 may be performed in any suitable order and some of the actions or steps may be performed in parallel. As illustrated, the central processing node 1010 obtains positions of the mobile merchant devices 1004 within the merchant environment 1002 over time (step 3000). The

TABLE 1

Example Measurements for Relative Positioning of the Mobile Customer Device

| Time | Measurement 1 | Measurement 2 | Measurement 3 |
|---|---|---|---|
| $t_1$ | $RSSI_{1,\,1}$ for MMD 1004-1 | $RSSI_{1,\,2}$ for MMD 1004-3 | $RSSI_{1,\,3}$ for SMD 1008-2 |
| $t_2$ | $RSSI_{2,\,1}$ for MMD 1004-1 | $RSSI_{2,\,2}$ for MMD 1004-3 | $RSSI_{1,\,3}$ for MMD 1004-2 |
| $t_3$ | $RSSI_{3,\,1}$ for MMD 1004-2 | $RSSI_{3,\,2}$ for MMD 1004-3 | $RSSI_{3,\,3}$ for MMD 1004-4 |
| $t_4$ | $RSSI_{4,\,1}$ for MMD 1004-4 | $RSSI_{4,\,2}$ for SMD 1008-3 | $RSSI_{4,\,3}$ for MMD 1004-6 |
| $t_5$ | $RSSI_{5,\,1}$ for MMD 1004-4 | $RSSI_{5,\,2}$ for MMD 1004-6 | $RSSI_{5,\,3}$ for MMD 1004-8 |
| $t_6$ | $RSSI_{6,\,1}$ for MMD 1004-6 | $RSSI_{6,\,2}$ for MMD 1004-7 | $RSSI_{6,\,3}$ for MMD 1004-8 |
| $t_7$ | $RSSI_{7,\,1}$ for MMD 1004-5 | $RSSI_{7,\,2}$ for MMD 1004-6 | $RSSI_{7,\,3}$ for MMD 1004-7 |

In this manner, the central processing node 1010 obtains relative positions of the mobile customer device 1006 over time. In addition, the positions of the mobile merchant devices 1004 are also tracked over time. The positions of the mobile merchant devices 1004 may be obtained using any suitable absolute or relative positioning technique. For example, the mobile merchant devices 1004 may be equipped with Global Navigation Satellite System (GNSS) receivers (e.g., Global Positioning System (GPS) receivers) and report their GNSS positions to the central processing node 1010 over time (e.g., periodically or open request). As another example, the positions of the mobile merchant devices 1004 may be relative positions relative to a reference point within the merchant environment 1002 (e.g., relative to a certain corner of the store, relative to a center of the store, relative to a position of one of the stationary merchant devices 1008, or the like). In this case, the relative positions of the mobile merchant devices 1004 may be obtained using any suitable positioning technique and measurements of signals transmitted from the stationary merchant devices 1008 that are received at the mobile merchant devices 1004, or vice versa. Some example positioning techniques that may be used include, but are not limited to, Wi-Fi Positioning System (WPS), Bluetooth Indoor Positioning, triangulation based on received signal strength measurements, triangulation based on ToA measurements, or the like).

Using the relative positions of the mobile customer device 1006 together with the positions of the mobile merchant devices 1004 and optionally the positions of the stationary merchant devices 1008, the central processing node 1010 determines the positions of the mobile customer device 1006 within the merchant environment 1002 over time. In other words, using the positions of the mobile merchant devices 1004 over time and optionally the positions of the stationary merchant devices 1008 over time, the computing device 1010 is able to convert the relative positions of the mobile positions of the mobile merchant devices 1004 are, in one embodiment, absolute positions (e.g., latitude and longitude coordinates) that are, e.g., obtained via GNSS or GPS receivers at the mobile merchant devices 1004. In another embodiment, the positions of the mobile merchant devices 1004 are relative positions that are relative to a reference position such as, e.g., a corner of the merchant environment 1002, a center of the merchant environment 1002, a known position of one of the stationary merchant devices 1008, or the like. Each position is preferably timestamped such that, for each mobile merchant device 1004, the central processing node 1010 obtains, and stores, multiple positions having respective timestamps that represent the position of the mobile merchant device 1004 over time.

The central processing node 1010 obtains the positions of the mobile merchant devices 1004 using, for example, any one or any combination of the following options:

Option 1: In this option, the central processing node 1010 receives the positions from the mobile merchant devices 1004, e.g., periodically or upon request. In this case, the mobile merchant device 1004 obtains its position using any suitable positioning technology such as, e.g.:

positioning hardware (e.g., GNSS or GPS receiver) at the mobile merchant device 1004; or measurements performed on signals received via a radio(s) (e.g., Ultra-Wideband (UWB) radio(s), Wi-Fi radio(s), Bluetooth radio(s), or the like) and associated processing circuitry, where, for each time at which the position is to be obtained, the processing circuitry determines the position of the mobile merchant device 1004 based on measurements performed on a radio signal(s) received from one or more other radio nodes (e.g., stationary merchant device(s) 1008) that are positioned at known (e.g., fixed) positions (e.g., using triangulation or similar technology). These measurements may include time-based measurements performed on the radio signal(s), signal-strength-based measurements performed on the radio signal(s), or a combination thereof.

Option 2: In this option, the central processing node 1010 computes the positions of the mobile merchant devices 1004 based on measurements reported by the mobile merchant devices 1004, e.g., periodically or upon request. For example, a mobile merchant device 1004 may be equipped with a radio(s) (e.g., UWB radio(s), Wi-Fi radio(s), Bluetooth radio(s), or the like) and associated processing circuitry that performs time-based or signal-strength-based measurements on a radio signal(s) received from one or more other radio nodes (e.g., stationary merchant device(s) 1010) that are positioned at known (e.g., fixed) positions (e.g., using triangulation or similar technology). The mobile merchant devices 1004 may then report the measurements, optionally with associated timestamps, to the central processing node 1010. The central processing node 1010 then computes the positions of the mobile merchant devices 1004 based on the reported measurements using a suitable positioning technique (e.g., triangulation).

Option 3: In this option, the central processing node 1010 receives the positions of the mobile merchant devices 1004 from another node. As an example, a stationary merchant device 1008 computes the positions of a mobile merchant device 1004 based on measurements of radio signals received from the mobile merchant device 1004 at the stationary merchant device 1008 or at multiple stationary merchant devices 1008. If multiple stationary merchant devices 1008 are involved, the measurements may be reported to one of the stationary merchant devices 1008 that is responsible for computing the positions of the mobile merchant device 1004.

Option 4: In this option, the central processing node 1010 receives measurements from one or more stationary merchant devices 1008 performed on radio signals transmitted by the mobile merchant devices 1004 and computes the positions of the mobile merchant devices 1004 based on the received measurements and known positions of the stationary merchant devices 1008.

Again, while described separately, any combination of the options above may be used. For example, positions of different mobile merchant devices 1004 (e.g., having different capabilities) may be obtained using different options. As another example, over time, the positions of the same mobile merchant device 1004 may be obtained using different options. As yet another example, positions of the same mobile merchant device 1004 may be obtained using two or more of the options above and combined (e.g., averaged).

The central processing node 1010 also obtains data indicative of a relative position(s) of a device of interest, which in the following description is the mobile customer device 1006, relative to one or more of the mobile merchant devices 1004 and optionally one or more of the stationary merchant devices (step 3002). This data may include, for example: (a) measurements, performed at the mobile customer device 1006, on radio signals received at the mobile customer device 1006 from one or more of the mobile merchant devices 1004, (b) measurements, performed at one or more of the mobile merchant devices 1004, on radio signals received at the one or more of the mobile merchant devices 1004 from the mobile customer device 1006, or both (a) and (b). The measurements may include time-based or signal-strength-based measurements. The measurement(s)

include or are otherwise associated to timestamps that indicate the time(s) at which the measurement(s) was performed. For (a), the central processing node 1010 may receive the measurements from the mobile customer device 1006, and the measurements include or otherwise are associated to information that identifies the mobile merchant device(s) 1004 from which the respective radio signal(s) was received. For (b), the central processing node 1010 may receive the measurements from the mobile merchant device(s) 1004. In one example embodiment, the radio signals in (a) or (b) above are Bluetooth beacons. If measurements for both (a) and (b) are obtained by the central processing node 1010, the central processing node 1010 may, for example, compute a first position estimate(s) (in step 3004 below) for the mobile customer device 1006 based on (a) and also compute a second position estimate(s) (in step 3004 below) for the mobile customer device 1006 based on (b). Then, for example, the first and second position estimate(s) may be combined to provide the (final) position estimate(s) for the mobile customer device 1006. For example, if a particular first position estimate and a second position estimate are for the same or essentially the same point in time, then these position estimates may be averaged to provide a single position estimate for the mobile customer device 1006 for that point in time. As another example, if a particular first position estimate and a second position estimate are for different points in time (e.g., two points in time that differ by more than a predefined or configured amount of time), then the first and second position estimates may both be used as different position estimates for the mobile customer device 1006 for the different points in time.

In addition to using the mobile merchant devices 1004, positioning of the mobile customer device 1006 in step 3002 may utilize one or more of the stationary merchant devices 1008. The manner in which the stationary merchant devices 1008 are used may be the same as that in which the mobile merchant devices 1004 are used, except that the positions of the stationary merchant devices 1008 are fixed over time. This hybrid approach that uses both the mobile merchant devices 1004 and one or more stationary merchant devices 1008 (e.g., Wi-Fi access point(s) or Bluetooth beacons) may be particularly beneficial in cases where the stationary merchant device(s) 1008 increase the number of signal strength measurements from 1 or 2 to 3 or 4, thereby increasing the accuracy of the positions.

As another example, the data received in step 3002 may include the positions of the mobile customer device 1006 with corresponding timestamps. More specifically, in one embodiment, the mobile customer device 1006 determines its own position based on time-based or signal-strength-based measurements of radio signals received from one or more of the mobile merchant devices 1004 and known positions of the one or more mobile merchant devices 1004. The positions of the one or more mobile merchant devices 1004 may, for example, be included in the radio signals or transmitted from the mobile merchant devices 1004 to the mobile customer device 1006 in association with the radio signals on which the measurements are performed by the mobile customer device 1006.

Note that, in some implementations, the positioning technology or technique used to obtain the positions of the mobile merchant devices 1004 is different than that used to obtain the positions of the mobile customer device 1006. For example, in one implementation, the positions of the mobile merchant devices 1004 are obtained via respective GNSS or GPS receivers at the mobile merchant devices 1004, and the positions (relative positions) of the mobile customer device 1006 may be obtained based on measurements performed on beacons (e.g., Bluetooth beacons) transmitted by the mobile merchant devices 1004 and/or the mobile customer device 1006.

The central processing node 1010 computes a position(s) of the mobile customer device 1006 based on the received data from step 3002 and the position(s) of the mobile merchant device(s) 1004 (obtained in step 3000) associated to the data received in step 3002 (step 3004). For example, the measurements from step 3002 may be converted to distance measurements between the mobile customer device 1006 and the associated mobile merchant device(s) 1004, and the position of the mobile customer device 1006 may then be computed based on the distance measurements and the positions of the associated merchant mobile device(s) 1004 (e.g., using triangulation).

Optionally, the central processing node 1010 performs one or more action(s) using the position estimate(s) for the mobile customer device 1006 (step 3006). These one or more action(s) may include, e.g., tracking the movement of the mobile customer device 1006 (and thus the associated customer) through the merchant environment 1002, providing targeted advertisements to the mobile customer device 1006 (and thus to the associated customer), or the like.

In some implementations, the mobile merchant devices 1004 are opted-in to a precise positioning technology (e.g., Wi-Fi infrastructure positioning). For example, a Wi-Fi network at the merchant environment 1002 may be secured for staff-only, and the mobile merchant devices 1004 may be connected to the secure Wi-Fi network and use the secure Wi-Fi network for positioning.

One example implementation using Bluetooth Low Energy (BLE) for positioning of the mobile customer device 1006 relative to the mobile merchant devices 1004 is as follows:

1. Merchant system (e.g., the central processing node 1010) tracks the precise positions of the mobile merchant devices 1004 in the merchant environment 1002. These measurements may be performed and used in real-time, or stored along with timestamps for post-processing.

2. The mobile merchant devices 1004 (with known positions from step 1) broadcast BLE beacons with respective identifiers.

3. The mobile customer device 1006 receives BLE beacons from at least a subset of the mobile merchant devices 1004 (likely from multiple mobile merchant devices 1004), measures the received signal strength of each received BLE beacon, and decodes the identifier of each received BLE beacon. For each received BLE beacon (or for each of a subset of the received BLE beacons such as, e.g., the N strongest received BLE beacons where N is, e.g., 3 or more), a distance between the mobile merchant device 1004 and the mobile customer device 1006 is calculated by comparing the received signal strength with a known transmission strength (e.g., transmit power used for transmission) of the BLE beacon, which is typically encoded as a field in the BLE beacon. These distance measurements and identifiers are stored with timestamps (e.g., for subsequent transmission to the central processing node 1010) or transmitted to the central processing node 1010 with their timestamps. Alternatively, the received signal strength measurements (optionally together the transmission strengths of the respective BLE beacons) along with their respective timestamps are transmitted to the central processing node 1010, where the central processing node 1010 computes distances based on these measurements and either stores the computed distances or uses them to compute the positions of the mobile customer device 1006 (e.g., in step 4 below).

4. For each of one or more time instances, the central processing node 1010 computes the position of the mobile customer device 1006 at that time instance based on the distances between the mobile customer device 1006 and the mobile merchant devices 1004 for which the measurements are received having timestamps at the desired time instance. Note that, in some implementations, the time instances for which the measurements are obtained may not be synchronized, in which case measurements with timestamps within a predefined or configured range from a desired time instance for the position estimate may be used.

Importantly, while the description herein focuses on embodiments in which the positions of the mobile customer device 1006 are computed at the central processing node 1010, the present disclosure is not limited thereto. For example, some or all of the positions of the mobile customer device 1006 may be computed at the mobile customer device 1006 based on measurements performed at the mobile customer device 1006 on signals received from at least some of the mobile merchant devices 1004 and optionally one or more of the stationary merchant devices 1008 together with positions of those mobile merchant devices 1004 and optionally those stationary merchant devices 1008. In this case, the positions of the mobile merchant devices 1004 may be provided to the mobile customer device 1006 within or in association with the signals received from the mobile merchant devices 1004. Likewise, the position(s) of the stationary merchant device(s) 1008 may be provided to the mobile customer device 1006 within or in association with the signal(s) received from the stationary merchant device(s) 1008. As another example, some or all of the positions of the mobile customer device 1006 may be computed by one or more of the mobile merchant devices 1004 based on measurements made at the mobile merchant devices 1004 on signals received from the mobile customer device 1006. In any event, if positions of the mobile customer device 1006 are computed by the mobile customer device 1006 and/or the mobile merchant devices 1004, these positions along with corresponding timestamps are, in some embodiments, reported to the central processing node 1010 and optionally used by the central processing node 1010 to perform one or more actions (e.g., track the position of the mobile customer device 1006 within the merchant environment 1002, provide targeted advertisements to the mobile customer device 1006 (or to an associated customer, e.g., via displays in the merchant environment 1002), or the like.

While the description herein focuses on positioning of mobile customer devices 1006, the positioning procedure disclosed herein may be used to estimate the position of other types of devices such as, e.g., devices attached, embedded, or otherwise associated to any person or object (e.g., an inventory item) that moves within the mobile environment.

While not being limited to or by any particular advantage, embodiments of the present disclosure may provide a number of advantages or benefits over existing technology. Using mobile merchant devices 1004 for positioning of the mobile customer device(s) 1006 mitigates the need for additional infrastructure. Staff are likely carrying such mobile merchant devices 1004 with them and in close proximity to mobile customer devices 1006. This means that positioning can be performed in the merchant environment 1002 using existing mobile merchant devices 1004 (modified, e.g., via software to operate as disclosed herein) rather than by deploying a potentially large number of fixed sensors throughout the merchant environment 1002.

Figure 4:
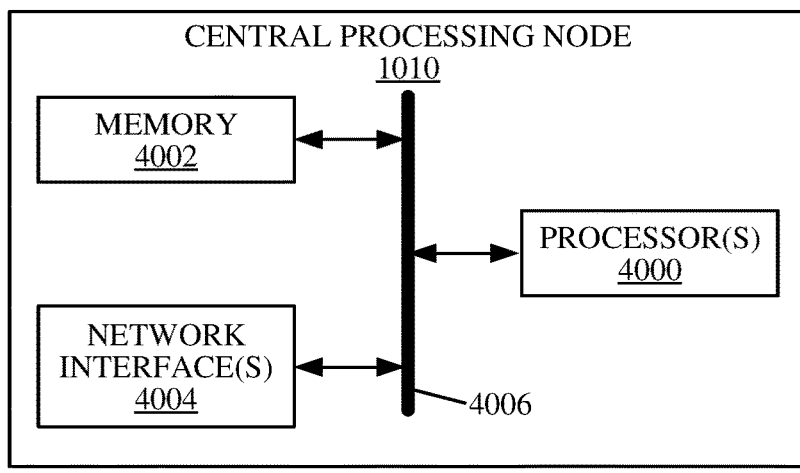
FIG. 4 illustrates one example embodiment of the central processing node of FIG. 1 and FIGS. 2A-2G.

FIG. 4 illustrates one example embodiment of the central processing node 1010. As illustrated, the central processing node 1010 includes one or more processors 4000 (e.g., Central Processing Units (CPUs), Application Specific Integrated Circuits (ASICs), Field Programmable Gate Arrays (FPGAs), and/or the like), memory 4002, and one or more network interfaces 4004 (e.g., a Wi-Fi network interface, a cellular (e.g., Fifth Generation (5G)) interface, an Ethernet network interface, or the like), connected via a bus 4006 or the like. The processors 4000 are also referred to herein as processing circuitry. In some embodiments, functionality of the central processing node 1010 described above is implemented in software that is stored in the memory 4002 and executed by the processor(s) 4000. Note that the central processing node 1010 may include additional components not illustrated in FIG. 4 such as, e.g., a power supply (e.g., a battery and associated power circuitry), etc.

In some embodiments, a computer program including instructions which, when executed by at least one processor, causes the at least one processor to carry out the functionality of the central processing node 1010, according to any of the embodiments described herein is provided. In some embodiments, a carrier comprising the aforementioned computer program product is provided. The carrier is one of an electronic signal, an optical signal, a radio signal, or a computer-readable storage medium (e.g., a non-transitory computer-readable medium such as memory).

Figure 5:
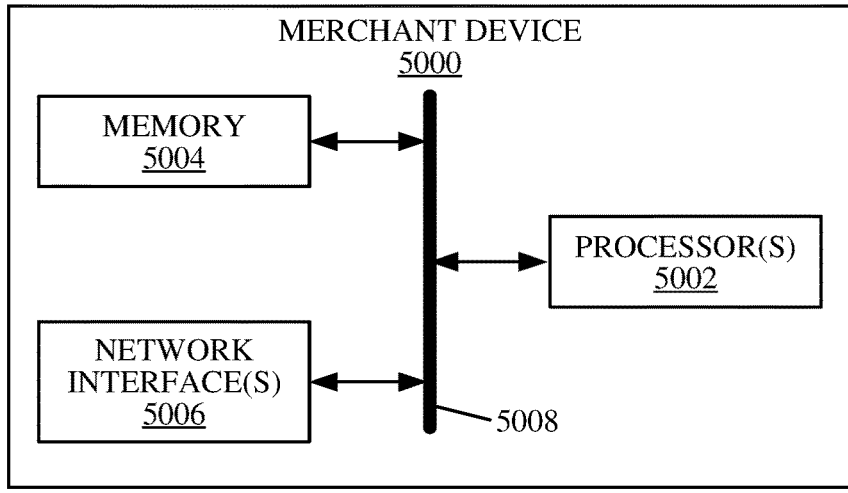
FIG. 5 illustrates one example embodiment of a merchant device, which may be either a mobile merchant device or a stationary merchant device of FIG. 1 and FIGS. 2A-2G.

FIG. 5 illustrates one example embodiment of a merchant device 5000, which may be either a mobile merchant device 1004 or a stationary merchant device 1008. As illustrated, the merchant device 5000 includes one or more processors 5002 (e.g., CPUs, ASICs, FPGAs, and/or the like), memory 5004, and one or more network interfaces 5006 (e.g., a Wi-Fi network interface or radio, a Bluetooth interface or radio, an UWB interface or radio, a cellular (e.g., 5G) interface, an Ethernet network interface, or the like), connected via a bus 5008 or the like. The processors 5002 are also referred to herein as processing circuitry. In some embodiments, functionality of the mobile merchant device 1004 or the stationary merchant device 1008 described above is implemented in software that is stored in the memory 5004 and executed by the processor(s) 5002. Note that the merchant device 5000 may include additional components not illustrated in FIG. 5 such as, e.g., a power supply (e.g., a battery and associated power circuitry), etc.

In some embodiments, a computer program including instructions which, when executed by at least one processor, causes the at least one processor to carry out the functionality of the merchant device 5000 (i.e., the mobile merchant device 1004 or the stationary merchant device 1008), according to any of the embodiments described herein is provided. In some embodiments, a carrier comprising the aforementioned computer program product is provided. The carrier is one of an electronic signal, an optical signal, a radio signal, or a computer-readable storage medium (e.g., a non-transitory computer-readable medium such as memory).

Figure 6:
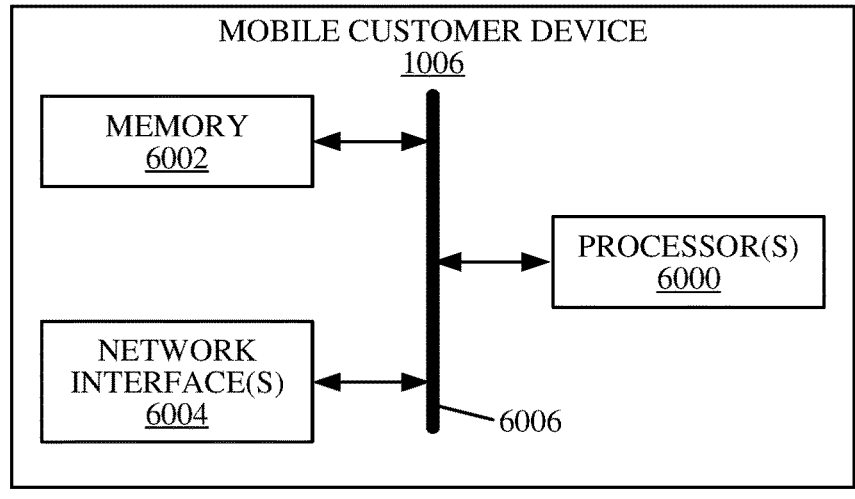
FIG. 6 illustrates one example embodiment of a mobile customer device of FIG. 1 and FIGS. 2A-2G.

FIG. 6 illustrates one example embodiment of a mobile customer device 1006. As illustrated, the mobile customer device 1006 includes one or more processors 6000 (e.g., CPUs, ASICS, FPGAs, and/or the like), memory 6002, and one or more network interfaces 6004 (e.g., a Wi-Fi network interface or radio, a Bluetooth interface or radio, an UWB interface or radio, a cellular (e.g., 5G) interface, an Ethernet network interface, or the like), connected via a bus 6006 or the like. The processors 6000 are also referred to herein as processing circuitry. In some embodiments, functionality of the mobile customer device 1006 described above is implemented in software that is stored in the memory 6002 and executed by the processor(s) 6000. Note that the mobile customer device 1006 may include additional components not illustrated in FIG. 6 such as, e.g., a power supply (e.g., a battery and associated power circuitry), etc.

In some embodiments, a computer program including instructions which, when executed by at least one processor, causes the at least one processor to carry out the functionality of the mobile customer device 1006, according to any of the embodiments described herein is provided. In some embodiments, a carrier comprising the aforementioned computer program product is provided. The carrier is one of an electronic signal, an optical signal, a radio signal, or a computer-readable storage medium (e.g., a non-transitory computer-readable medium such as memory).

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
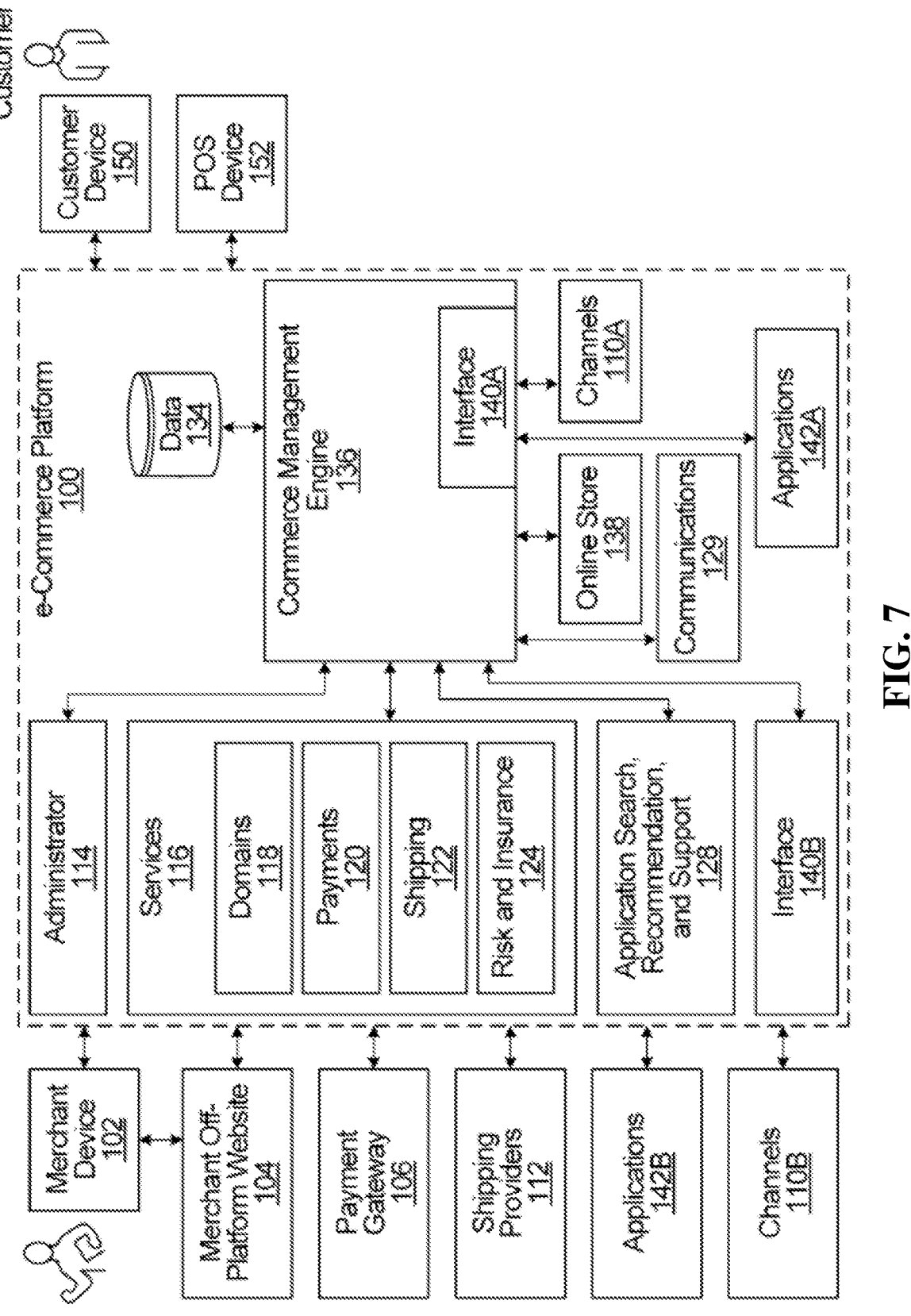
FIG. 7 illustrates an example e-commerce platform, according to one embodiment.

FIG. 7 illustrates an example e-commerce platform 100, according to one embodiment. The e-commerce platform 100 may be exemplary of the e-commerce platform 105 described with reference to FIG. 8. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colours, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
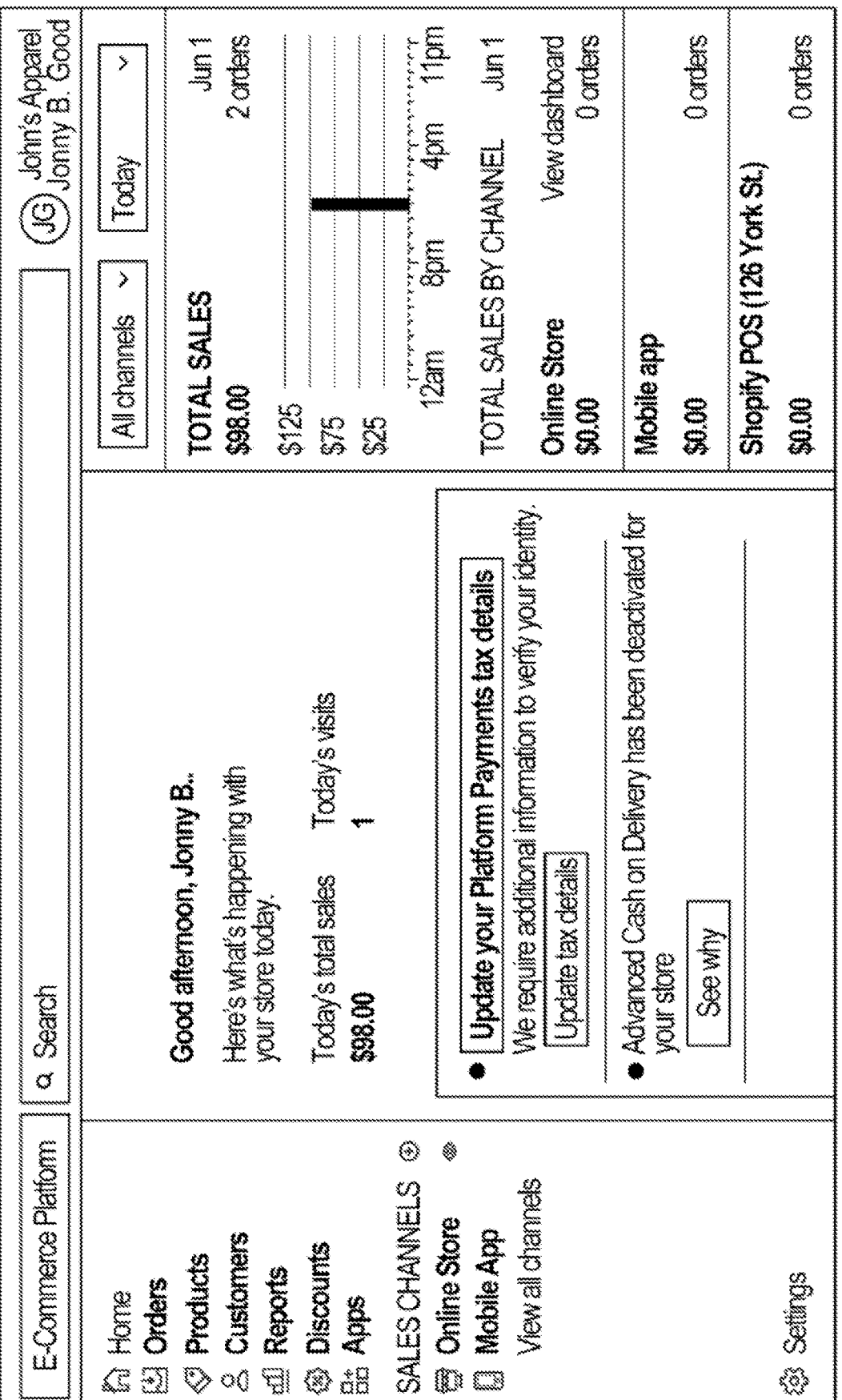
FIG. 8 depicts a non-limiting embodiment for a home page of an administrator.

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and colour, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
obtaining positions of a plurality of mobile merchant devices within a merchant environment;
obtaining data indicative of a relative position of a device of interest relative to one or more of the plurality of mobile merchant devices; and
computing a position of the device of interest within the merchant environment based on the data indicative of the relative position of the device of interest relative to the one or more of the plurality of mobile merchant devices and positions of the one or more of the plurality of mobile merchant devices;
wherein the positions of the plurality of mobile merchant devices are obtained via a first positioning technology, and the position of the device of interest is computed based on location data obtained via one or more second positioning technologies that are different than the first positioning technology.

2. The method of claim 1, wherein the device of interest is a mobile customer device.

3. The method of claim 1, wherein the device of interest is a device attached to, integrated into, or otherwise associated to an object of interest.

4. The method of claim 1, wherein the first positioning technology is a Global Navigation Satellite System (GNSS), Ultra-Wideband (UWB), or Wi-Fi positioning technology.

5. The method of claim 4, wherein the one or more second positioning technologies comprise a Bluetooth positioning technology.

6. The method of claim 1, wherein obtaining the positions of the plurality of mobile merchant devices within the merchant environment comprises obtaining a plurality of positions for each of the plurality of mobile merchant devices within the merchant environment over time.

7. The method of claim 6, wherein the data indicative of the relative position of the device of interest relative to the one or more of the plurality of mobile merchant devices comprises data indicative of a plurality of relative positions of the device of interest relative to the one or more of the plurality of mobile merchant devices over time.

8. The method of claim 7, wherein the position computed for the device of interest is a first position computed for the device of interest for a first point in time, and the method further comprises computing one or more additional positions for the device of interest within the merchant environment for one or more additional points in time based on the data indicative of the relative position of the device of interest relative to the one or more of the plurality of mobile merchant devices and the positions of the one or more of the plurality of mobile merchant devices, for the respective one or more additional points in time.

9. The method of claim 1, wherein obtaining the positions of the plurality of mobile merchant devices within the merchant environment comprises receiving the positions from the plurality of mobile merchant devices.

10. The method of claim 1, wherein the data indicative of the relative position of the device of interest relative to the one or more of the plurality of mobile merchant devices comprises: (a) measurements on radio signals received at the device of interest from the one or more of the plurality of mobile merchant devices, (b) measurements on radio signals received at one or more of the plurality of mobile merchant devices from the device of interest, or (c) both (a) and (b).

11. The method of claim 10, wherein obtaining the data indicative of the relative position of the device of interest relative to the one or more of the plurality of mobile merchant devices comprises obtaining the measurements of the radio signals received, from one or more of the plurality of mobile merchant devices, at the device of interest.

12. The method of claim 11, wherein obtaining the measurements of the radio signals received, from one or more of the plurality of mobile merchant devices, at the device of interest comprises receiving the measurements of the radio signals from the device of interest.

13. The method of claim 12, wherein the measurements of the radio signals are time-based or signal-strength-based measurements indicative of distances between the device of interest and the one or more of the plurality of mobile merchant devices.

14. The method of claim 1, wherein obtaining the data indicative of the relative position of the device of interest relative to the one or more of the plurality of mobile merchant devices comprises obtaining measurements of radio signals received, from the device of interest, at one or more of the plurality of mobile merchant devices.

15. The method of claim 14, wherein obtaining the measurements of the radio signals received, from the device of interest, at one or more of the plurality of mobile merchant devices comprises receiving the measurements of the radio signals from the one or more of the plurality of mobile merchant devices.

16. The method of claim 15, wherein the radio signals are time-based or signal-strength-based measurements indicative of distances between the device of interest and the one or more of the plurality of mobile merchant devices.

17. The method of claim 1, wherein:
the data indicative of the relative position of the device of interest relative to the one or more of the plurality of mobile merchant devices comprises data indicative of distances between the device of interest and three or more of the plurality of mobile merchant devices; and
computing the position of the device of interest within the merchant environment comprises triangulating the position of the device of interest within the merchant environment based on the data indicative of the distances between the device of interest and the three or more of the plurality of mobile merchant devices and positions of the three or more of the plurality of mobile merchant devices within the merchant environment.

18. The method of claim 1, wherein:
the data indicative of the relative position of the device of interest relative to the one or more of the plurality of mobile merchant devices comprises first data indicative of a first relative position of the device of interest relative to a first subset of the plurality of mobile merchant devices and second data indicative of a second relative position of the device of interest relative to a second subset of the plurality of mobile merchant devices; and
computing the position of the device of interest within the merchant environment comprises:
computing a first position of the device of interest within the merchant environment based on the first data and positions of the first subset of the plurality of mobile merchant devices within the merchant environment;
computing a second position of the device of interest within the merchant environment based on the second data and positions of the second subset of the plurality of mobile merchant devices within the merchant environment; and
combining the first position and the second position to provide the position of the device of interest within the merchant environment.

19. The method of claim 18, wherein the first position of the device of interest and the second position of the device of interest are associated to a same time instant.

20. The method of claim 1, further comprising performing one or more actions based on the position of the device of interest.

21. A processing node, comprising:
processing circuitry; and
memory storing instructions executable by the processing circuitry whereby the processing node is operable to:
obtain positions of a plurality of mobile merchant devices within a merchant environment;
obtain data indicative of a relative position of a device of interest relative to one or more of the plurality of mobile merchant devices; and
compute a position of the device of interest within the merchant environment based on the data indicative of the relative position of the device of interest relative to the one or more of the plurality of mobile merchant devices and positions of the one or more of the plurality of mobile merchant devices;
wherein the positions of the plurality of mobile merchant devices are obtained via a first positioning technology, and the position of the device of interest is computed based on location data obtained via one or more second positioning technologies that are different than the first positioning technology.

22. A non-transitory computer readable medium storing instructions executable by processing circuitry of a processing node whereby the processing node is caused to:
obtain positions of a plurality of mobile merchant devices within a merchant environment;
obtain data indicative of a relative position of a device of interest relative to one or more of the plurality of mobile merchant devices; and
compute a position of the device of interest within the merchant environment based on the data indicative of the relative position of the device of interest relative to the one or more of the plurality of mobile merchant devices and positions of the one or more of the plurality of mobile merchant devices;
wherein the positions of the plurality of mobile merchant devices are obtained via a first positioning technology, and the position of the device of interest is computed based on location data obtained via one or more second positioning technologies that are different than the first positioning technology.

* * * * *